United States Patent
Neal et al.

(10) Patent No.: US 9,346,392 B1
(45) Date of Patent: May 24, 2016

(54) MODULAR CARGO TRACK MOUNTING ADAPTER

(71) Applicant: NEAL TECHNOLOGIES IP HOLDINGS, LLC, Mesa, AZ (US)

(72) Inventors: Kennieth Neal, Mesa, AZ (US); Kenneth Kreuter, Jr., San Tan Valley, AZ (US)

(73) Assignee: Neal Technologies IP Holdings, LLC, Mesa, AZ (US)

( * ) Notice: Subject to any disclaimer, the term of this patent is extended or adjusted under 35 U.S.C. 154(b) by 0 days.

(21) Appl. No.: 14/723,293

(22) Filed: May 27, 2015

(51) Int. Cl.
B60P 7/08 (2006.01)

(52) U.S. Cl.
CPC .................... B60P 7/0815 (2013.01)

(58) Field of Classification Search
CPC .................................................. B60P 7/0815
USPC .............. 410/34, 89, 96, 102, 104–106, 115, 410/116, 120; 224/404, 405, 547; 211/85.29, 94.01
See application file for complete search history.

(56) References Cited

U.S. PATENT DOCUMENTS

| 8,764,358 B2 * | 7/2014 | Bose | B60P 7/08 410/32 |
|---|---|---|---|
| 2011/0027034 A1 * | 2/2011 | Chamoun | B60P 3/077 410/104 |

* cited by examiner

*Primary Examiner* — Stephen Gordon
(74) *Attorney, Agent, or Firm* — Hartman Titus PLC; John D. Titus

(57) ABSTRACT

A mounting adapter for use with E-track modular cargo track comprises a face plate and a jaw member. The jaw member comprises a generally cuboid body with two steps in the front face near each end and a bevel in the back face at each end. The steps and bevel cooperate to enable the jaw member to be inserted through the rectangular opening of the E-track into the narrow confines between the web of the E-track and the side or floor of the cargo bed. Once inserted, the steps center the jaw member vertically within the rectangular opening so that the face plate can be attached without the jaw member dropping into the space behind the E-track. The raised portions of the jaws include female threads adapted to receive a threaded fastener for fastening an object to the E-track while simultaneously capturing the E-track between the jaw and the face plate.

11 Claims, 6 Drawing Sheets

US 9,346,392 B1

MODULAR CARGO TRACK MOUNTING ADAPTER

BACKGROUND OF THE INVENTION

This invention relates generally to cargo restraint systems, in particular, to cargo restraints for use with modular cargo restraints installed in trucks and other vehicles.

Light and medium-duty trucks and other trucks intended for use in hauling cargo are frequently equipped with modular cargo restraint systems. A popular modular cargo restraint system known as "E-track" comprises a winged a.k.a. "hat section" channel member, usually formed of galvanized steel, having a 4 inch wide web, ½ inch tall flanges and ½ inch wide wings mounted longitudinally along the walls and/or floor of the truck cargo bed. The channel member has rectangular openings spaced at regular intervals along the length of the track. Cargo restraints, such as that disclosed in U.S. Pat. No. 6,109,846, are attached to the E-track by inserting a connector (typically a T-shaped sheet metal bracket) into one of the rectangular openings. A second connector is inserted into a second one of the rectangular openings. A cargo strap, extending between the two E-track connectors is wrapped around the cargo and drawn tight. The tension on the cargo strap keeps the E-track connectors tight against the E-track so that they cannot twist out of the opening or rattle loose while applying a restraining force to the cargo.

Because E-track connectors rely on tension to keep the E-track connectors in place, they are not generally well-suited for securing an item to the wall or floor of the truck cargo bed. For example, a class II or similar fire extinguisher typically comes with a wall-mount bracket, which rigidly secures the fire extinguisher to the wall while providing a quick-release in the event the fire extinguisher is needed. If the fire extinguisher is secured to the E-track using a single E-track connector, the lack of tension on the E-track connector will allow the fire extinguisher to rattle against the wall and possibly shake loose. If the fire extinguisher is secured to the E-track using to conventional E-track connectors and a strap, the fire extinguisher will be secured but cannot be quickly released in the event the fire extinguisher is needed. Accordingly, what is needed is an E-track mounting adapter that is capable of providing a rigid mounting point so that a fire extinguisher or other equipment can be mounted without the necessity of maintaining external tension on the E-track connector.

SUMMARY OF THE INVENTION

The present invention comprises an E-track mounting adapter that is capable of providing a rigid mounting point. According to an illustrative embodiment, the E-track mounting adapter comprises a face plate and a jaw member, which is attached to the face plate by one or more threaded fasteners. The jaw member comprises a generally cuboid body, however, the front face of the jaw member has two steps near each end and the back face has a bevel at each end. The steps and bevel cooperate to enable the jaw member to be inserted through the rectangular opening of the E-track into the narrow confines between the web of the E-track and the side or floor of the cargo bed. Once inserted, the steps center the jaw member vertically within the rectangular opening so that the face plate can be attached without the jaw member dropping into the space behind the E-track. The raised portions of the jaws preferably include female threads adapted to receive threaded fasteners for fastening an object to the E-track. Preferably the raised portions of the jaws are formed so that they are slightly shorter than the thickness of the web of the E-track. This is so that when an object is secured to the adapter, the fasteners themselves cause the adapter to forcefully squeeze the E-track between the jaw and the face plate.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

Figure 1:
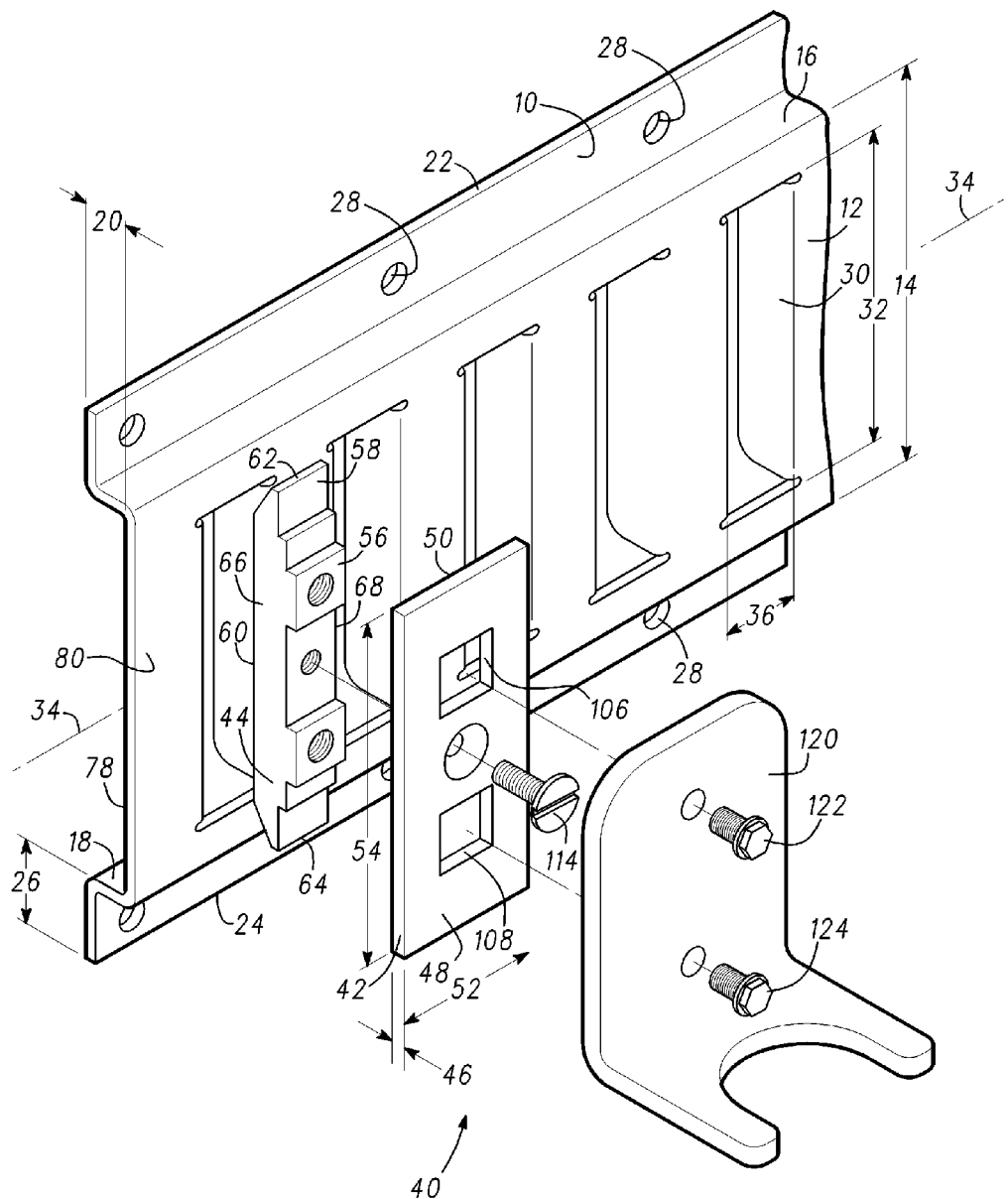
FIG. 1 is a perspective view of a modular cargo track mounting adapter system incorporating features of the present invention.
Figure 2:
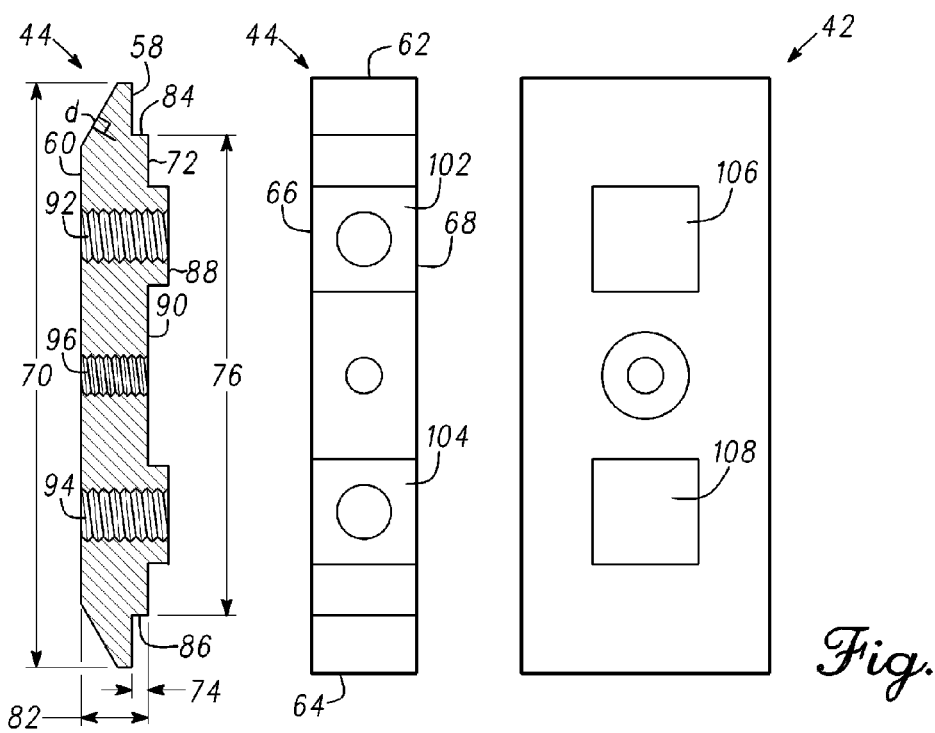
FIG. 2 is a detailed view of the jaw and face plate members of the modular cargo track mounting adapter of FIG. 1.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

With reference to FIG. 1, a popular modular cargo restraint system known as "E-track" comprises a winged channel member 10, usually formed of 12 Ga (0.108 inch thick) galvanized steel. Winged channel member 10 has a web 12 having a web width 14, which is typically about 4 inches. Winged channel member 10 has a pair of flanges 16, 18 each of which has a flange height 20 (the distance from mounting surface to the back side of web 12), which is typically about ½ inch. Winged channel member 10 also has a pair of wings 22, 24 each of which has a winged width 26, also typically about ½ inch. The winged channel member 10 is typically secured to the wall or floor of a vehicle (not shown) by means of screws, rivets or other conventional fasteners extending through holes 28 formed in wings 22 and 24. The winged channel member 10 includes a plurality of regularly-spaced rectangular openings 30, which typically are oriented so that the long side 32 of rectangular opening 30 is transverse to the longitudinal axis 34 of winged channel member 10 and the short side 36 of rectangular opening 30 is parallel to the longitudinal axis 34 of winged channel member 10. However, in certain installations the orientation is rotated 90 degrees.

As noted herein before, when used in a conventional manner, E-track connectors are inserted into two of the rectangular openings 30 and a strap connected between the E-track connectors is drawn tight to secure a load between the connectors and also to prevent the connectors themselves from rattling.

A modular cargo track mounting adapter 40 incorporating features of the present invention includes a faceplate 42 and a jaw member 44. Faceplate 42 may be formed of any suitable material and in any suitable thickness but in the illustrative embodiment faceplate 42 is formed of 10-12ga steel, preferably zinc plated, having a thickness 46 of approximately 0.138 inches. Faceplate 42 has a front surface 48, which provides a rigid flat mounting surface as described more fully hereinafter. Faceplate 42 further includes a back surface 50, which bears against the front face 80 of web 12 when cargo track mounting adapter 40 is installed. Faceplate 42 preferably has a width dimension 52 that is wider than the short side 36 of rectangular opening 30 or a height dimension 54 that is longer than the long side 32 of rectangular opening 30, so that faceplate 42 will not pass through rectangular opening 30 when loaded in that direction.

With additional reference to FIGS. 2-5, jaw member 44 comprises a substantially cuboid body 56 with a front face 58, a back face 60, a top end 62, a bottom end 64, and two parallel sides 66 and 68. Jaw member 44 is formed so that the length dimension 70 between top end 62 and bottom end 64 is greater than the long side 32 of rectangular opening 30, so that jaw member 44 will not pass through rectangular openings 30 when loaded in that direction. Jaw member 44 includes a first raised portion 72 that extends above front face 58 to form a step in the profile of jaw member 44 at both ends. The height 74 of raised portion 72 above front face 58 is selected to be no more than the thickness "t" of web 12 of channel member 10, and the length dimension 76 between outside walls 84 and 86 of raised portion 72 is selected to be no more than the long side 32 of rectangular openings 30. The thickness 82 of jaw member 44 between back face 60 and raised portion 72 is selected to be less than flange height 20 of channel member 10.

Jaw member 44 further includes a second raised portion 88, which in the illustrative embodiment contains apertures 92, 94 which are threaded to receive a conventional threaded fastener. The height 118 of second raised portion 88 is selected to be no more than the thickness 46 of faceplate 42 plus the thickness "t" of web 12. Raised portion 88 may optionally have a recess 90 formed therein and may include an additional threaded aperture 96. Raised portion 88 together with a recess 90 forms a pair of bosses 102, 104 which correspond with apertures 106, 108 formed in faceplate 42. Jaw member 44 further includes bevels 98, 100 formed in back surface 60. Bevels 98, 100 are formed so that the distance "d" measured perpendicular to bevels 98, 100 taken from bevels 98, 100 to the surface of raised portion 72 is less than flange height 20 of channel member 10.

Figure 3:
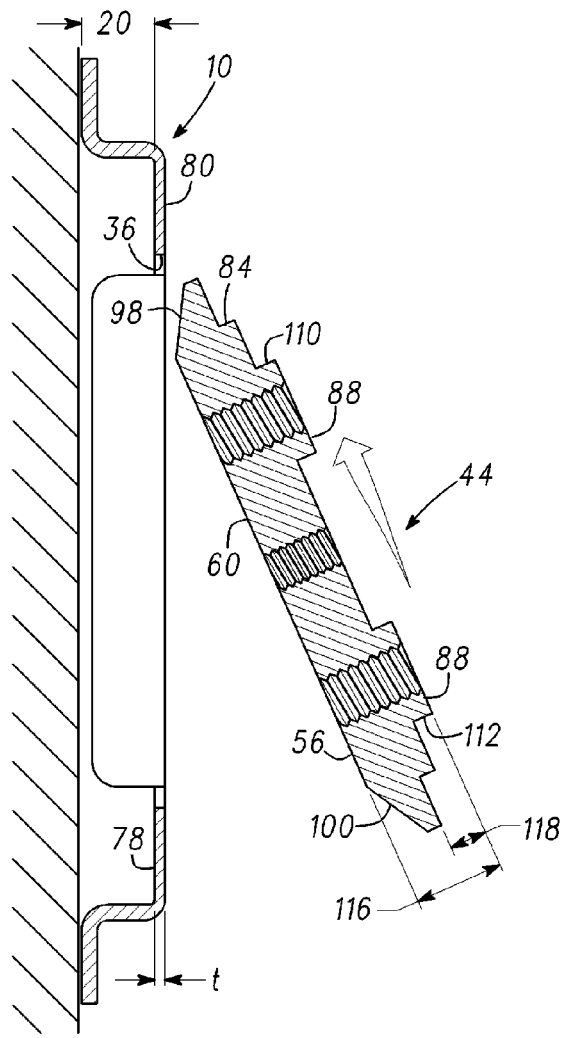
FIG. 3 is a cross sectional view of the modular cargo track mounting adapter of FIG. 1 in an unassembled position.
Figure 4:
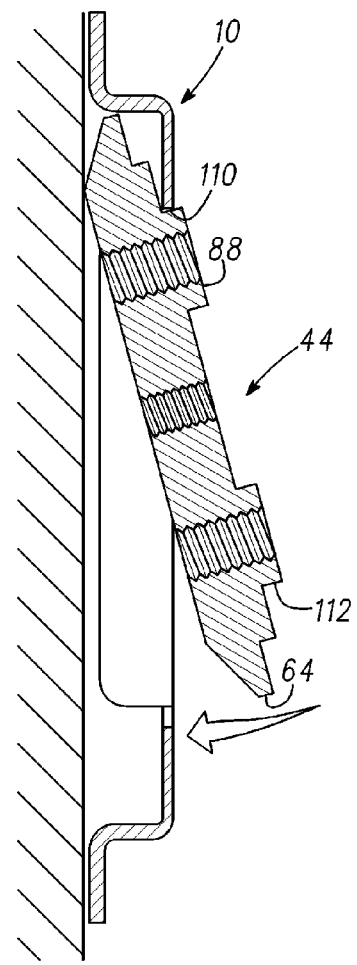
FIG. 4 is a cross sectional view of the modular cargo track mounting adapter of FIG. 1 in a partially assembled position.
Figure 5:
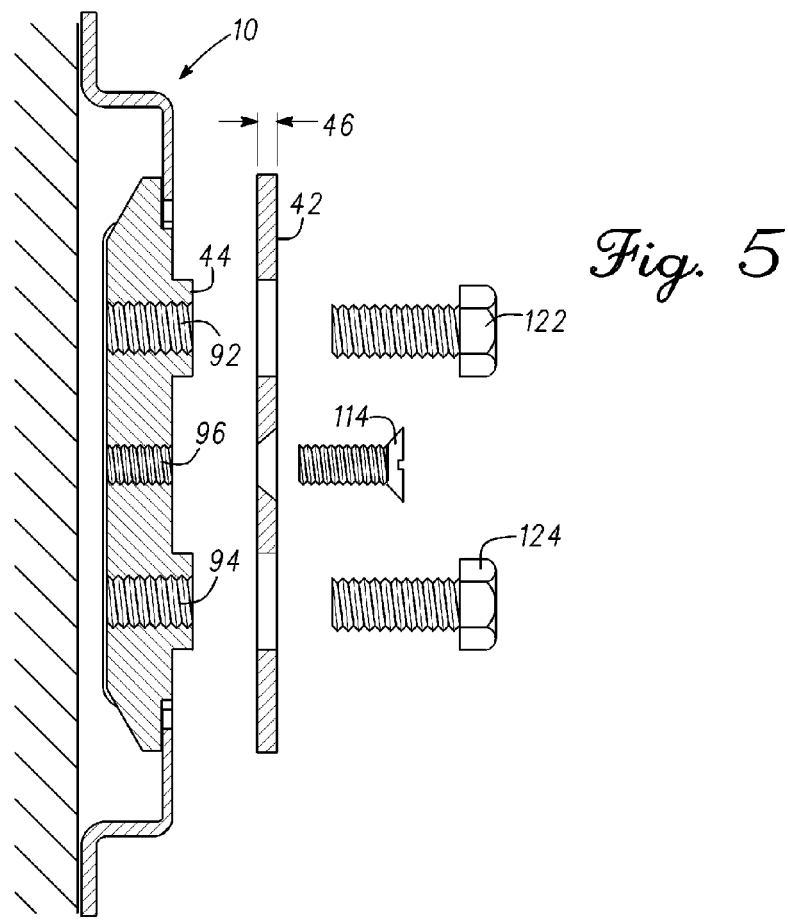
FIG. 5 is a cross sectional view of the modular cargo track mounting adapter of FIG. 1 in a more fully assembled position.

With particular reference to FIGS. 3-5, a modular cargo track mounting adapter 40 incorporating features of the present invention is assembled to channel member 10 by inserting one end of jaw member 44 through one of the plurality of rectangular openings 30 into the recess behind web 12 until outside wall 110 comes to rest against short side 36 of rectangular opening 30 as shown in FIG. 4. The distance between outside wall 110 of second raised portion 88 and bottom end 64 is no more than the long side 32 of rectangular openings 30. Accordingly jaw member 44 can be rotated completely through rectangular opening 30 into the position shown in FIG. 5.

Figure 8:
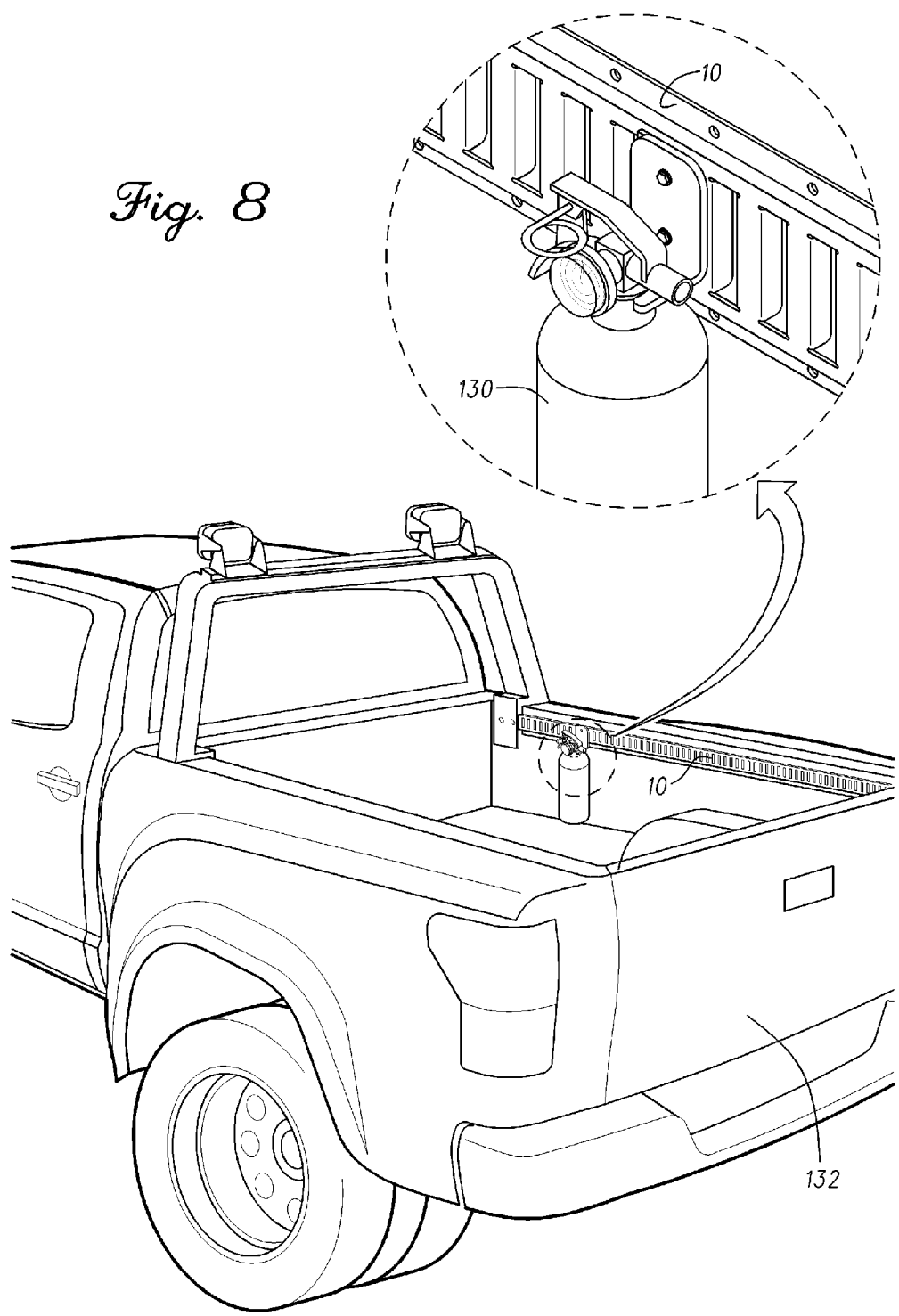
FIG. 8 is a perspective view of a vehicle with a modular cargo track mounting adapter system incorporating features of the present invention.

In the illustrative embodiment, with jaw member 44 rotated into position, the overall thickness 116 prevents jaw member 44 from falling completely into the cavity. It then may be moved into the position as shown in FIG. 5 with front face 58 of jaw member 44 bearing against rear surface 78 of channel member 10. In this position, the length dimension 76 between outside walls 84 and 86 of first raised portion 72 centers jaw member 44 within rectangular opening 30. Faceplate 42 may then be optionally attached with a flathead screw 114 threaded into aperture 96. Because the height 74 of first raised section 72 is less than the thickness "t" of channel member 10, channel member 10 is held firmly between jaw 44 and faceplate 42. A bracket, for example fire extinguisher bracket 120 is then attached with conventional threaded fasteners 122, 124. Because the height 118 of second raised portion 88 is less than the thickness 46 of faceplate 42 plus the thickness "t" of web 12, (and since the height 74 of the first raise portion is less than the thickness "t" of web 12) threaded fasteners 122, 124 add additional squeeze to channel member 10 between jaw 44 and faceplate 42 when bracket 120 is tightened onto faceplate 42. This additionally secures mounting bracket 120 to channel member 10 to withstand the roughest environments, for example when mounted in the bed of an off road vehicle 132 as shown in FIG. 8.

Figure 7:
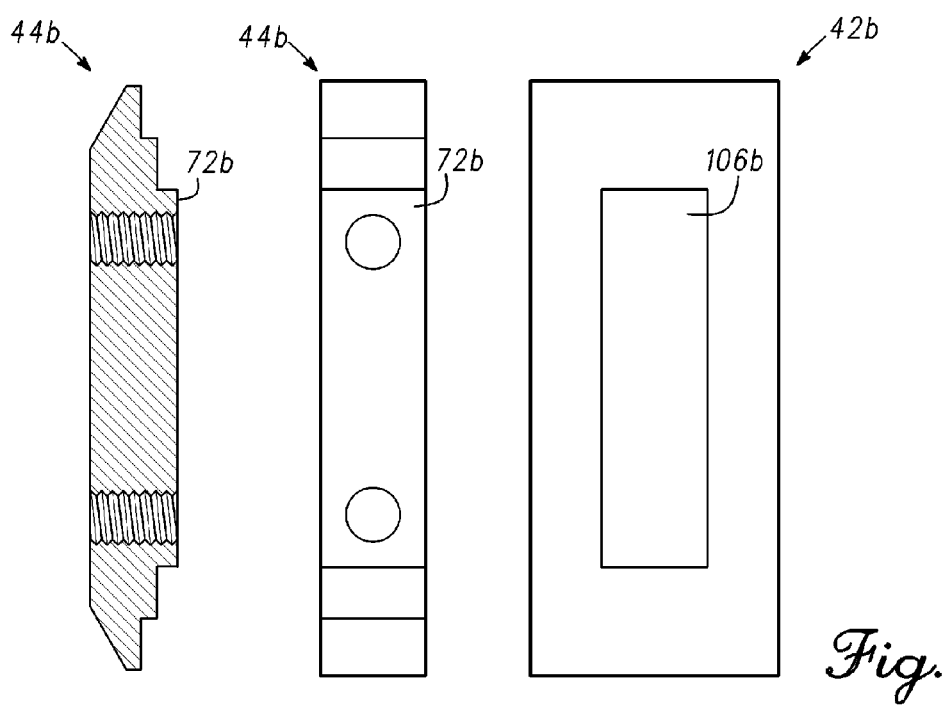
FIG. 7 is a detailed view of the jaw and face plate members of another alternative embodiment of the modular cargo track mounting adapter of FIG. 1.
Figure 6:
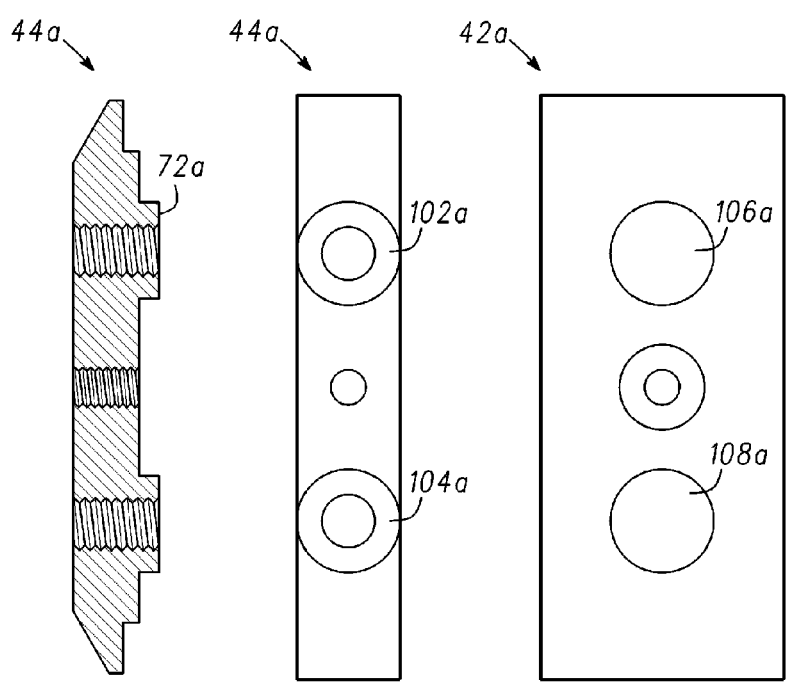
FIG. 6 is a detailed view of the jaw and face plate members of an alternative embodiment of the modular cargo track mounting adapter of FIG. 1.
Figure 9:
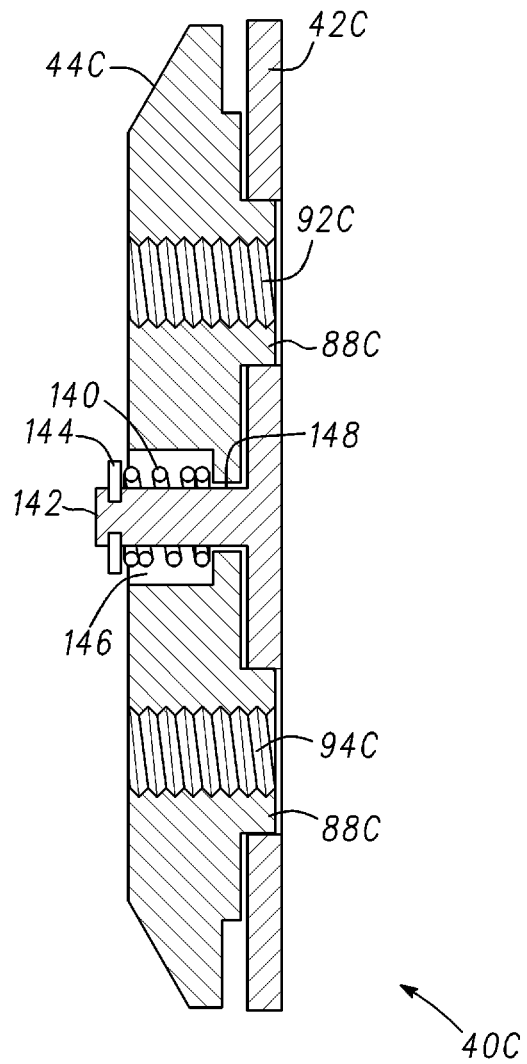
FIG. 9 is a cross sectional view of an alternative embodiment of a modular cargo track mounting adapter.

Although certain illustrative embodiments and methods have been disclosed herein, it will be apparent from the foregoing disclosure to those skilled in the art that variations and modifications of such embodiments and methods may be made without departing from the invention. For example although in the illustrative embodiment the flange 18 has a linear cross section, flange 18 may have a Z cross section or other nonlinear shape prior to joining web 12. Also, although in the illustrative embodiment of FIGS. 1-5 second raised portion 88 is threaded to receive a conventional threaded fastener other fasteners including for example rivets or threaded stud extending from raised portion may be employed without departing from the scope of the invention. Similarly although in the illustrative embodiment of FIGS. 1-5 second raised portion 88 is substantially rectangular and therefore raised bosses 102 and 104 are substantially rectangular or square, as shown in FIG. 6, raised portion 72a may have a curvilinear profile to form circular raised bosses 102a and 104a. Additionally, as shown in FIG. 7, recess 90 may be omitted so that raised portion 72b is a single rectangular surface in which case aperture 106b in faceplate 42b is also rectangular. Additionally although the illustrative embodiment of FIGS. 1-5 contemplates a face plate that bears on the front surface 80 of web 12, a face plate that bears on the slanted flaps that form of openings 30, and therefore is mounted flush with surface 80 is within the scope of the invention. Finally, although the illustrative embodiment of FIGS. 1-5 contemplate optional use of a flathead screw 114 threaded into aperture 96 as a means of retaining modular cargo track adapter 40 to channel member 10, an alternative means is shown in FIG. 9. As shown in FIG. 9, faceplate 42c comprises a post 142 having a groove adapted to receive a conventional retaining ring 144. Jaw member 44c is formed with a recess 146 and a bore 148. Faceplate 42c is assembled to jaw member 44c by inserting post 142 through bore 148. A compression spring 140 is placed over post 142 and retained by retaining ring 144. Cargo track adapter 40c is attached to channel member 10 by pressing against raised portions 88c to compress spring 140. Once cargo track adapter 40c is in place, the force of spring 140 prevents cargo track adapter 40c from falling out of place. Securing a load to cargo track adapter 40c by threading into threaded apertures 92c and 94c then clamps jaw member 44c tightly to channel member 10.

Accordingly, it is intended that the invention should be limited only to the extent required by the appended claims and the rules and principles of applicable law. Additionally, as used herein, references to direction such as "up" or "down" are intend to be exemplary and are not considered as limiting the invention and, unless otherwise specifically defined, the terms "generally," "substantially," or "approximately" when used with mathematical concepts or measurements mean within ±10 degrees of angle or within 10 percent of the measurement, whichever is greater. As used herein, a step of "providing" a structural element recited in a method claim means and includes obtaining, fabricating, purchasing, acquiring or otherwise gaining access to the structural element for performing the steps of the method. As used herein, the claim terms are to be given their broadest reasonable meaning unless a clear disavowal of that meaning appears in the record in substantially the following form ("As used herein the term _____ is defined to mean _____")

What is claimed is:

1. Apparatus for securing cargo to a modular track, the modular track comprising a winged channel having a predetermined web width and a predetermined flange height, the winged channel being formed of a material having a predetermined thickness, the winged channel further having a plurality of regularly-spaced rectangular openings having a long side and a short side, the apparatus comprising:
a jaw member, the jaw member comprising a cuboid body having a first end, a second end and a longitudinal axis extending between the first and second ends, the first and second ends being separated by a first length dimension that is longer than the long side of each of the plurality of rectangular openings, the cuboid body further comprising a front face, a back face and two substantially parallel side walls, the front face further comprising a first raised area having an upper surface, a first outside wall and a first height dimension, the first height dimension being less than the predetermined thickness of the winged channel material, the first outside wall being proximal the first end of the jaw member, the front face further comprising a second raised area having a second outside wall and a second height dimension, the second height dimension being less than the combined depth of a face plate plus the predetermined thickness of the winged channel material, the second outside wall being proximal the first end of the jaw member, the second raised area having at least one aperture for receiving a fastener;
wherein the jaw member is formed so that the distance from the second outside wall to the second end of the cuboid body is less than the long side of the rectangular opening.

2. The apparatus of claim 1, wherein:
the first raised area further comprises a third outside wall proximal the second end of the cuboid body, wherein the jaw member is formed so that the distance from the first outside wall to the third outside wall is substantially equal to the long side of the rectangular opening.

3. The apparatus of claim 1, wherein:
the second raised area comprises a central recessed portion.

4. The apparatus of claim 3, wherein:
the central recessed portion comprises an aperture for receiving a fastener.

5. The apparatus of claim 3, wherein:
the back face of the cuboid body includes a first beveled edge proximal the first end and a second beveled edge proximal the second end, wherein a thickness measured perpendicular to one of the beveled edges from the beveled edge to the upper surface of the first raised area is less than the flange height of the winged channel.

6. The apparatus of claim 1, wherein:
a back surface of the face plate is longer than the long side of each of the plurality of rectangular openings.

7. The apparatus of claim 1, wherein:
a back surface of the face plate is wider than the short side of each of the plurality of rectangular openings.

8. The apparatus of claim 7, wherein:
the back surface of the face plate is longer than the long side of each of the plurality of rectangular openings.

9. The apparatus of claim 1, further comprising;
the face plate, the face plate comprising a body having a front surface and a back surface defining a predetermined depth therebetween, the plate having at least one opening extending from the front surface to the back surface.

10. A method of securing cargo to the inside of a vehicle having a modular track, the modular track comprising a winged channel having a predetermined web width and a predetermined flange height, the winged channel being formed of a material having a predetermined thickness, the winged channel further having a plurality of regularly-spaced rectangular openings having a long side and a short side, the method comprising:
providing a jaw member, the jaw member comprising a cuboid body having a first end, a second end and a longitudinal axis extending between the first and second ends, the first and second ends being separated by a first length dimension that is longer than the long side of each of the plurality of rectangular openings, the cuboid body further comprising a front face, a back face and two substantially parallel side walls, the front face further comprising a first raised area having an upper surface, a first and a third outside wall and a first height dimension, the first height dimension being less than the predetermined thickness of the winged channel, the first outside wall being proximal the first end of the jaw member, the third outside wall being proximal the second end of the jaw member, the front face further comprising a second raised area having a second outside wall and a second height dimension, the second height dimension being less than the combined depth of a face plate plus the predetermined thickness of the winged channel, the second outside wall being proximal the first end of the jaw member, the second raised area having at least one aperture for receiving a fastener wherein the jaw member is formed so that the distance from the second outside wall to the second end of the cuboid body is less than the long dimension of the rectangular opening;
inserting the jaw member through one of the plurality of regularly-spaced rectangular openings and positioning the jaw member so that the second outside wall area abuts the short side of one of the rectangular openings;
rotating and translating the jaw member until the first and third outside walls each abut the short side of one of the rectangular openings; and
attaching the cargo to the jaw member.

11. The method of claim 10, further comprising:
providing the face plate, the face plate comprising a body having a front surface and a back surface defining a predetermined depth therebetween, the plate having at least one opening extending from the front surface to the back surface; and attaching the face plate to the jaw member so that the winged channel is captured between the jaw member and the face plate.

* * * * *